United States Patent
Tierney et al.

(10) Patent No.: US 9,982,937 B2
(45) Date of Patent: May 29, 2018

(54) APPLIANCE WITH GEARED DRAWER ASSEMBLY

(71) Applicant: Dometic Sweden AB, Solna (SE)

(72) Inventors: James Tierney, Osceola, IN (US); Craig Reske, Niles, MI (US); James Gregory Bowers, Middlebury, IN (US)

(73) Assignee: Dometic Sweden AB, Solna (SE)

( * ) Notice: Subject to any disclaimer, the term of this patent is extended or adjusted under 35 U.S.C. 154(b) by 0 days. days.

(21) Appl. No.: 15/239,623

(22) Filed: Aug. 17, 2016

(65) Prior Publication Data

US 2017/0051967 A1 Feb. 23, 2017

Related U.S. Application Data

(60) Provisional application No. 62/207,697, filed on Aug. 20, 2015.

(51) Int. Cl.
| | |
|---|---|
| *F25D 25/00* | (2006.01) |
| *F25D 25/02* | (2006.01) |
| *A47B 88/40* | (2017.01) |
| *A47B 88/04* | (2006.01) |
| *F16H 19/04* | (2006.01) |
| *A47B 88/493* | (2017.01) |

(Continued)

(52) U.S. Cl.
CPC ........ *F25D 25/025* (2013.01); *A47B 88/0422* (2013.01); *A47B 88/40* (2017.01); *A47B 88/45* (2017.01); *A47B 88/493* (2017.01); *F16H 19/04* (2013.01); *F25D 25/022* (2013.01); *A47B 88/443* (2017.01); *A47B 2088/401* (2017.01); *A47B 2210/0078* (2013.01); *A47B 2210/04* (2013.01); *A47B 2210/175* (2013.01); *F25D 25/005* (2013.01)

(58) Field of Classification Search
CPC .... F25D 25/025; F25D 25/005; F25D 23/021; F25D 23/028; A47B 2088/401; A47B 2088/40; A47B 2210/0078; A47B 2210/175

See application file for complete search history.

(56) References Cited

U.S. PATENT DOCUMENTS

| | | |
|---|---|---|
| 2,429,696 A | 10/1947 | Merkt |
| 6,389,753 B1 | 5/2002 | Fenelon |

(Continued)

FOREIGN PATENT DOCUMENTS

| | | |
|---|---|---|
| AT | 13357 | 11/2013 |
| CN | 103206832 | 7/2013 |

(Continued)

OTHER PUBLICATIONS

European Patent Office, International Search Report and Written Opinion for PCT/IB2016/054935, 12 pages Nov. 15, 2016.
Transmittal Letter of Related Cases.

*Primary Examiner* — Daniel J Rohrhoff
(74) *Attorney, Agent, or Firm* — Middleton Reutlinger

(57) ABSTRACT

An appliance is provided having a cabinet with at least one compartment for positioning of a drawer. The drawer may be moved into and out of the at least one compartment and the drawer comprises a food container. The drawer includes a geared assembly having a gear rack and pinion gear which inhibit wobble of the drawer when the drawer is pulled from the at least one compartment or is pushed into the at least one compartment.

31 Claims, 11 Drawing Sheets

(51) Int. Cl.
*A47B 88/45* (2017.01)
*A47B 88/443* (2017.01)

(56) References Cited

U.S. PATENT DOCUMENTS

| | | | |
|---|---|---|---|
| 6,499,818 B2 | 12/2002 | Brustle | |
| 6,848,759 B2 | 2/2005 | Doombos et al. | |
| 6,994,410 B2 | 2/2006 | Hogan | |
| 7,430,937 B2 | 10/2008 | Rotter et al. | |
| 7,594,707 B2 | 9/2009 | Kunkle et al. | |
| 7,677,125 B2 | 3/2010 | Rotter | |
| 7,997,667 B2 | 8/2011 | Rotter et al. | |
| 7,997,668 B2 | 8/2011 | Lee | |
| 8,052,234 B2 | 11/2011 | Liang et al. | |
| 8,074,468 B2 | 12/2011 | Yoo et al. | |
| 8,141,968 B2 | 3/2012 | Velarde et al. | |
| 8,147,013 B2 * | 4/2012 | Park | A47B 88/40 312/331 |
| 8,157,339 B2 | 4/2012 | Park et al. | |
| 8,210,623 B2 | 7/2012 | Chen et al. | |
| 8,210,625 B2 | 7/2012 | Rotter et al. | |
| 8,360,539 B2 | 1/2013 | Brown et al. | |
| 8,366,214 B2 | 2/2013 | Krammer | |
| 8,366,215 B2 | 2/2013 | Chen | |
| 8,376,481 B2 | 2/2013 | Lee | |
| 8,408,663 B2 | 4/2013 | Chellappan et al. | |
| 8,668,286 B2 | 3/2014 | Gasser | |
| 8,668,287 B2 | 3/2014 | Schwarzmann | |
| 8,668,290 B2 | 3/2014 | Rotter et al. | |
| 8,864,249 B2 | 10/2014 | Nam et al. | |
| 8,931,863 B2 | 1/2015 | Vulava et al. | |
| 2009/0045713 A1 * | 2/2009 | Kunkle | A47B 88/40 312/402 |
| 2009/0302728 A1 | 12/2009 | Rotter et al. | |
| 2010/0283365 A1 * | 11/2010 | Chen | A47B 88/487 312/334.4 |
| 2011/0162402 A1 * | 7/2011 | Park | F25D 23/021 62/264 |
| 2011/0210655 A1 * | 9/2011 | Brown | A47B 88/40 312/334.8 |
| 2012/0125035 A1 * | 5/2012 | Chellappan | F25D 25/025 62/340 |
| 2013/0002115 A1 | 1/2013 | Friesenecker et al. | |
| 2013/0093306 A1 | 4/2013 | Shin | |
| 2013/0129266 A1 | 5/2013 | Chen | |
| 2013/0129267 A1 * | 5/2013 | Chen | A47B 88/04 384/20 |
| 2013/0249367 A1 * | 9/2013 | Chen | A47B 88/14 312/334.8 |
| 2013/0270987 A1 | 10/2013 | Kelly | |
| 2013/0270989 A1 | 10/2013 | Park et al. | |
| 2013/0334950 A1 | 12/2013 | Kim et al. | |
| 2014/0117830 A1 * | 5/2014 | Lee | F25D 25/025 312/402 |
| 2014/0130537 A1 * | 5/2014 | Gu | F25C 1/04 62/344 |
| 2014/0202273 A1 | 7/2014 | Moody et al. | |
| 2014/0238383 A1 | 8/2014 | Armstrong | |
| 2014/0239788 A1 | 8/2014 | Turner | |
| 2014/0265783 A1 | 9/2014 | Hauer et al. | |
| 2014/0354132 A1 * | 12/2014 | Jessie | F25D 25/025 312/334.8 |
| 2015/0028735 A1 | 1/2015 | Nam et al. | |

FOREIGN PATENT DOCUMENTS

| | | |
|---|---|---|
| EP | 1350443 | 12/2004 |
| EP | 2025262 | 2/2009 |
| EP | 2634516 | 9/2013 |
| WO | 2007007950 | 1/2007 |
| WO | 2017029625 | 2/2017 |

* cited by examiner

US 9,982,937 B2

APPLIANCE WITH GEARED DRAWER ASSEMBLY

CLAIM TO PRIORITY

This non-provisional patent application claims priority to and benefit of, under 35 U.S.C. § 119(e), U.S. Provisional Patent Application Ser. No. 62/207,697, filed Aug. 20, 2015 and titled "Appliance with Geared Drawer Assembly", all of which is incorporated by reference herein.

BACKGROUND

Field of the Invention

Present embodiments relate to an appliance having a drawer. More specifically, present embodiments relate to an appliance for example a refrigerator with a drawer having a geared assembly to inhibit wobble and binding of the drawer during movement.

Some appliances utilize a drawer to provide storage as a refrigerator compartment or sometimes as a bottom freezer compartment. When moving these drawers, it is possible that the drawer wobbles in a left to right or lateral direction. This is undesirable and can lead to binding of the drawer movement.

As a result of such wobble, drawers can jam or alternatively be stuck in a position either partially extended or partially retracted, which is undesirable.

Accordingly, it is desirable to overcome this and other known issues with sliding drawers and provide a drawer movement which inhibits such wobble and the related binding of the drawer.

The information included in this Background section of the specification, including any references cited herein and any description or discussion thereof, is included for technical reference purposes only and is not to be regarded subject matter by which the scope of the invention is to be bound.

SUMMARY

According to some embodiments, an appliance is provided having a housing or cabinet with at least one compartment for positioning of a drawer. The drawer may be moved into and out of the at least one compartment and the drawer includes a food container. The drawer includes a geared assembly which engages an opposed rack so that the gear and rack inhibit wobble of the drawer when the drawer is pulled from the at least one compartment or is pushed into the at least one compartment.

According to some embodiments, a geared drawer assembly for a cooling appliance comprises a cabinet having a drawer compartment therein, a drawer which is movable into and out of the drawer compartment. A first rack gear and a second rack gear are disposed within the drawer compartment. A first pinion gear and a second pinion gear are pivotally mounted to the drawer and engaging the rack gear. Each of the first and second rack gears having a first row and a second row of gear teeth. The first row of gear teeth and the second row of gear teeth are offset in a longitudinal direction.

Optionally, the geared drawer assembly may have one of a food basket or a food container. The geared drawer assembly may further comprise one of a rib or a depression between the first and second row of gear teeth on the first and second gear racks. The surface between teeth of the gear teeth of the rack gears may be one of flat or angled. The pinion gears may have a rib which is positioned within a depression between the first and second rows of the gear teeth on the first and second rack gears. The first and second gear pinions each may have a first circumferential row and a second circumferential row of gear teeth. The gear teeth of the first circumferential row are offset circumferentially from the gear teeth of the second circumferential row. The geared drawer assembly may further comprise an axle extending between the first pinion gear and the second pinion gear. The geared drawer assembly may further comprise a first mount and a second mount connected to the drawer. For example, the first mount and the second mount may be located on a rear wall of the drawer. The floor may be elevated from the bottom of the drawer compartment. The geared drawer assembly may further comprising a drawer compartment housing. A food container may define a portion of the drawer. The geared drawer assembly may further comprise a secondary food container disposed on an upper edge of the drawer. The geared drawer assembly may further comprise slides on the upper end of the drawer. The slides may be connected to the secondary food container and allow movement of the secondary food container relative to the drawer. The secondary food container may comprise a wire basket. Further, the secondary food container may comprise multiple containers.

According to further embodiments, a geared drawer assembly for a cooling appliance may comprise an appliance housing having a drawer compartment therein, a food container movable within the drawer compartment, a first pinion gear and a second pinion gear rotatably connected to the drawer, a first rack gear and a second rack gear disposed within the drawer compartment engaging the first pinion gear and second pinion gear, respectively. The rack gear having an upper surface from which rack teeth extend, the upper surface being flat or angled. The first and second pinion gears each have first and second rows of gear teeth, the gear teeth being offset along a circumferential direction of the pinion gears.

Optionally, the geared drawer assembly may further comprise one of a longitudinal rib or a longitudinal depression extending along the rack. The other of a longitudinal rib or a longitudinal depression may extend circumferentially about the first and second gear pinions. The geared drawer assembly may further comprise a first mount and a second mount on the food container. Further, an axle may extend from the first mount to the second mount. The first mount and the second mount each having a force tab which engages the axle and inhibits disengagement of the first and second gear pinions from the first and second gear racks, respectively.

According to still further embodiments, a geared drawer assembly comprises an appliance having a compartment and a drawer, the drawer being movable into and out of the compartment, a first rack gear and a second rack gear fixed within the compartment relative to a floor within the compartment, a first pinion gear and a second pinion gear, the first pinion gear disposed above the first rack gear and the second rack gear, respectively, and engaging the rack gears, each of the pinion gears has a first row and a second row of circumferentially arranged gear teeth, the gear teeth of the first row and the gear teeth of the second row being misaligned in an axial direction, the first rack gear and the second rack gear each having a first row and a second row of rack gear teeth, the rack gear teeth of the first row and the rack gear teeth of the second row being misaligned so that the gear teeth of said pinion gears engage the rack gear teeth.

The engagement of the rack gears and the pinion gears reduce wobble of the drawer when the drawer moves relative to the compartment.

Optionally, the gear teeth of pinion gears having a spacing relationship relative to the rack gear teeth, wherein said gear teeth of said rack gears and said pinion gears engage one another. The geared drawer assembly may further comprising slides located near an upper end of the drawer. A secondary food container may be connected to the slides. The secondary food container may be capable of movement relative to the drawer. The secondary food container may be formed of at least one wire basket. The secondary food container may have at least one retaining clip disposed along an inner surface of the slides.

According to still further embodiments, a geared drawer assembly comprises a drawer including a cover connected to a food container, a rack gear positioned on the drawer, a pinion gear located on a wall of an appliance compartment positioned for engagement of the rack gear, the pinion gear having first and second rows of gear teeth, said gear teeth of said first row offset in a circumferential direction from the second row of gear teeth, the rack gear having a first row of rack gear teeth and a second row of rack gear teeth, the first row offset in a longitudinal direction from the second row of rack gear teeth, the rack gear including one of a rib and a depression, the pinion gear including the other of the rib and the depression.

According to still further embodiments, a geared drawer assembly comprises a drawer which has a food container slidable relative to a drawer compartment, a first mount and a second mount removable disposed on said drawer. An axle being disposed through the mounts, the axle having first and second pinion gears disposed near ends thereof, respectively. First and second rack gears are disposed in the drawer compartment and are engaged by the first and second pinion gears.

All of the above outlined features are to be understood as exemplary only and many more features and objectives of an appliance with geared drawer assembly may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the appliance with geared drawer assembly will now be described by way of examples. These embodiments are not to limit the scope of the claims as other embodiments of the appliance with geared drawer assembly will become apparent to one having ordinary skill in the art upon reading the instant description. Non-limiting examples of the present embodiments are shown in figures wherein:

DETAILED DESCRIPTION

Figure 1:
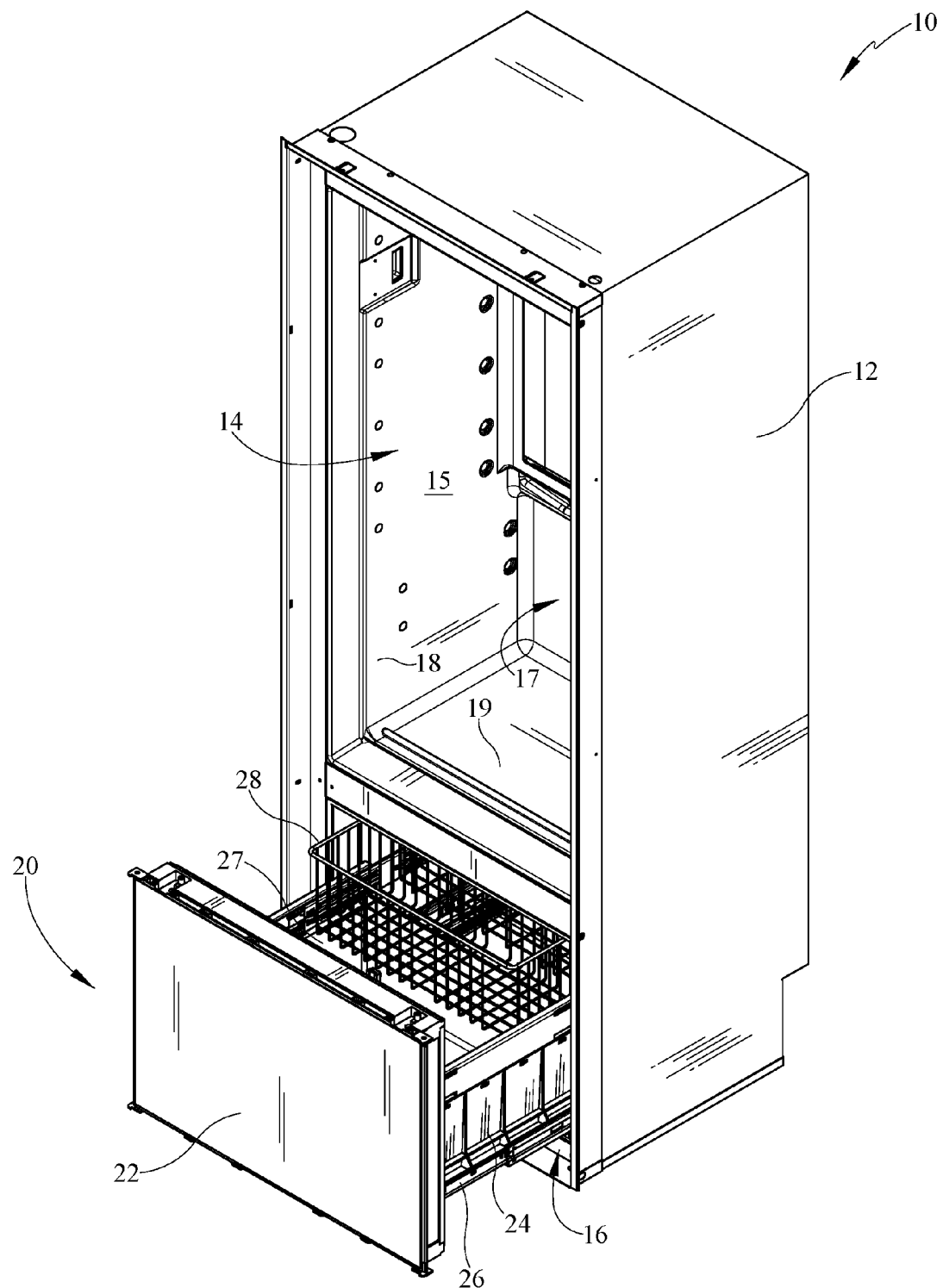
FIG. 1 is a perspective view of an appliance, for example a refrigerator freezer.

It is to be understood that the appliance with geared drawer assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

With reference to FIGS. 1-11, an appliance is provided with a geared drawer assembly. The appliance may be any of various types of appliances including but not limited to refrigerator freezers. The appliance may include at least one drawer which is moved into and out of a compartment of the appliance. The geared drawer assembly includes structure which inhibits lateral wobble of the drawer during movement into an out of the compartment. The structure may include a pinion and rack gear near each side of the drawer and may include gear teeth which reduce slop between gears and which may reduce or otherwise eliminate some wobble.

Referring now to FIG. 1, an appliance 10 is shown in perspective view. The appliance 10 may be a refrigerator freezer in some embodiments. Alternatively the appliance 10 may be formed of other devices which have at least one drawer and drawer compartment. In the depicted embodiment, one or more front doors are removed for ease of description and to reveal interior volume.

The appliance 10 may be a vertically standing structure as many refrigerator freezers are generally known. However, the appliance 10 maybe oriented in a horizontal configuration or may be formed of other shapes. For purpose of this disclosure, various appliances may be embodied which utilize a drawer.

The appliance 10 comprises a cabinet 12 having an upper compartment 14 and a lower compartment 16. The upper compartment 14 includes an interior compartment housing 18 which may be insulated and define a plurality of walls forming a boundary for the upper compartment 14. In some embodiments, the upper compartment 14 may include two sidewalls 15, 17 and an upper wall (now shown) and lower wall 19. The upper compartment 14 is shown open at the front due to the compartment door being removed. For example, the upper compartment 14 may have one or more doors which open to provide access to the interior compartment housing 18, wherein food may be stored. In some embodiments, the upper compartment 14 may include a French-door arrangement or alternatively may include a hinge arrangement at either of the sidewalls of the cabinet 12 for a single door depending on which direction door opening is desirable within a kitchen, an RV or the like.

Beneath the upper compartment 14 it is a lower compartment 16, located within the cabinet 12. The lower compartment 16 may define a refrigerator or a freezer according to some embodiments. As shown in the depicted embodiment, a drawer 20 extends from within the lower compartment 16. The drawer 20 is shown in an open position but alternatively may be slidably moved into the lower compartment 16 so as to close the compartment 16.

The drawer 20 comprises a cover or door 22 which is connected to a food container 24. Above the food container may be a slidable basket 28 which is capable of sliding relative to the food container 24 when the drawer 20 is extended in its open position shown. The basket 28 may also be used in place of the food container 24.

In some embodiments, the drawer 20 may provide a slide 26 on one or both sides of the food container 24. The slide 26 allows for guided movement of the drawer 20 into and out of the lower compartment 16. The slide 26 may include one guide in the lower compartment 16 and a slide rail drawer 20, or vice versa.

It should be understood that the specific configuration of the depicted appliance is not limiting. For example, an exemplary embodiment may include an upper and a lower door or a side-by-side door arrangement either of which may be above or below a drawer.

Figure 2:
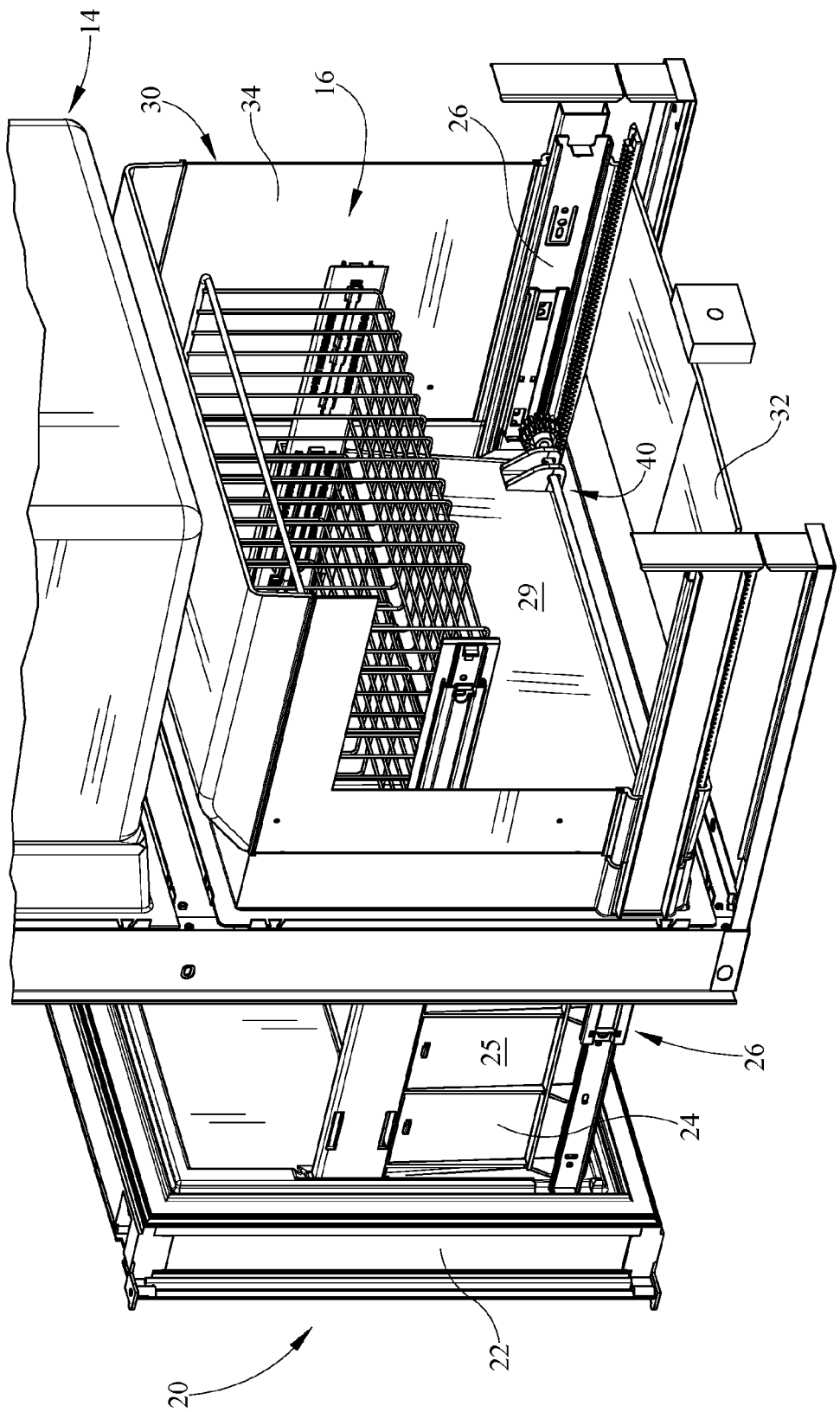
FIG. 2 is a perspective view of a lower compartment geared appliance drawer.

Referring now to FIG. 2, a perspective view of the appliance 10 shown with portions of the cabinet 12 removed in the area of the lower compartment 16. In the depicted embodiment, with portions of the cabinet 12 removed, a geared assembly 40 may be viewed. At the forward end of the cabinet 12 is the drawer 20. The drawer 20 may comprise a drawer cover 22 and the food container 24. The food container 24 is connected to the rear surface of the drawer 20. The food container 24 may have two sidewalls 25, 27 and a rear wall 29. The food container 24 may also comprise a front wall or, alternatively the drawer cover 22 may serve as the front wall of the food container 24. The drawer cover 22 may include some insulating material to limit heat transfer from inside the cabinet 12 to the outside of the cabinet 12.

As shown in the embodiment, the drawer 20 is partially extended from the lower compartment 16. The lower compartment 16 includes a lower compartment housing 30 including a plurality of walls 34 and a floor 32. In the depicted embodiment, the drawer 20 moves into the lower compartment housing 30 of the lower compartment 16. However, the drawer 20 may be located elsewhere.

The geared assembly 40 is disposed on the drawer 20 at each lateral side and operably connects the food container 24 and lower compartment housing 30. The slides 26 guide movement of the food container 24 into and out of the lower compartment 16. However, at times one side of the food container 24 may move faster than the opposite side such that the container 24 may become skewed and the slides 26 can bind. When this occurs, the drawer 20 can react to the uneven pace and wobble during movement thereof.

To resolve this performance, the geared drawer assembly 40 inhibits wobble of the drawer 20. The geared drawer assembly 40 which may be capable of occurring if the slides 26 are used alone. The geared drawer assembly 40 comprises a rack gear and a pinion gear which operate to synchronize, or more closely synchronize, movement of the right and left sides of the drawer 20. The geared drawer assembly 40 inhibits one side of the drawer 20 from moving too fast as compared to another side. In turn, this inhibits binding of the slides 26 or wobble of the drawer 20 and connected food container 24.

Figure 3:
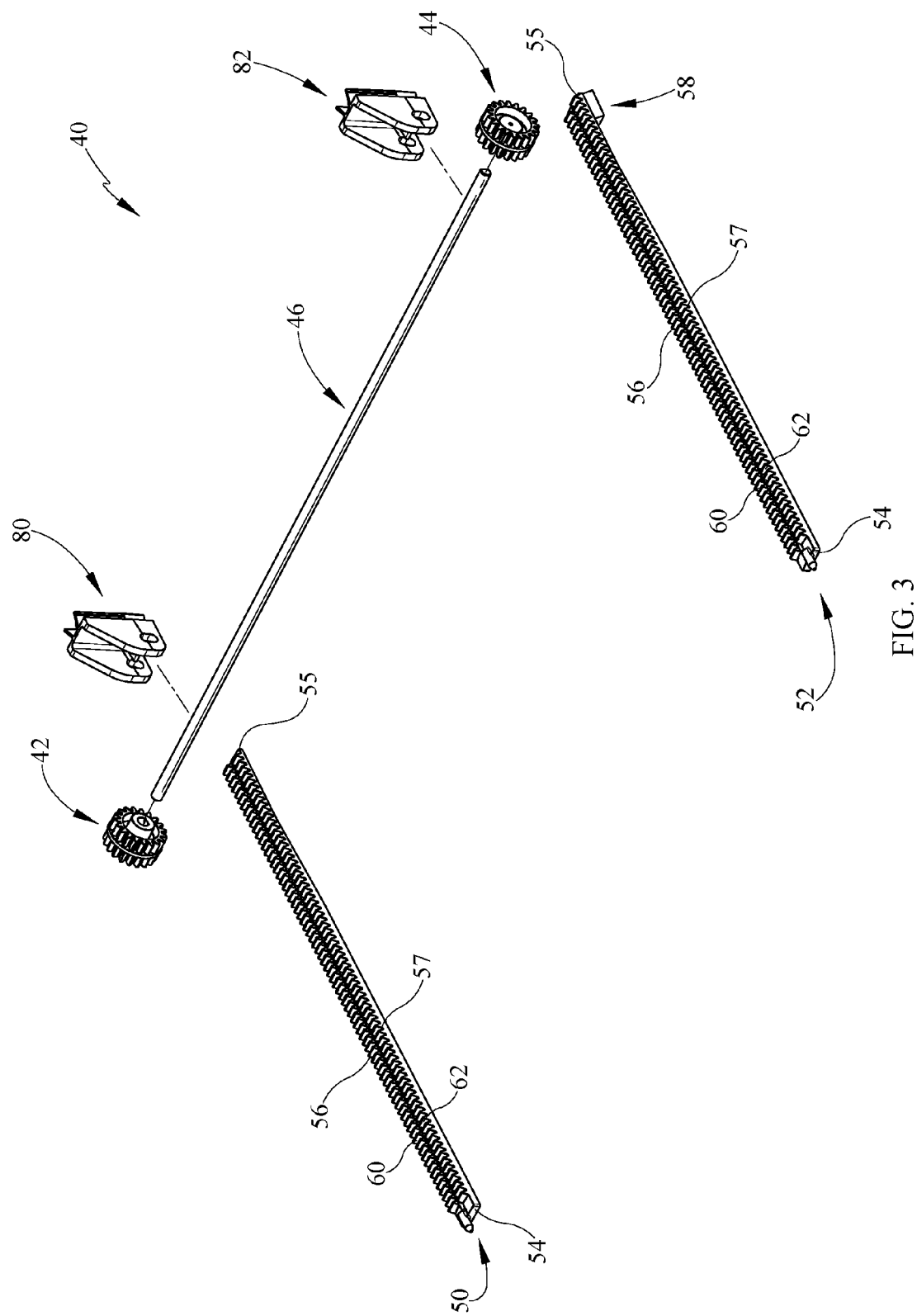
FIG. 3 is and exploded perspective view of a gear assembly for an appliance drawer.

Referring now to FIG. 3, a perspective view of the geared drawer assembly 40 is shown. The assembly 40 comprises first and second rack gears 50, 52, first and second pinion gears 42, 44 and an axle 46 extending between the pinion gears 42, 44. The geared assembly 40 synchronizes, or more closely matches the speed of the sides of the drawer 20.

Referring first to the rack gear 50, the rack comprises two rows 56, 57 of gear teeth 60, 62. The rack gear 50 has a first end 54 and a second end 55. Similarly, the second gear rack 52 comprises a first end 54 and a second end 55. Each rack gear 50, 52 is fixed to the floor 32 so that the pinions 42, 44 can rotate along and engage, respectively.

The gear racks 50, 52 may also comprise retaining structures 58 which connect to the gear racks to the floor 32 of the lower compartment housing 30 (FIG. 2). In the instant embodiment, the retaining structure 58 may be a dovetail inhibiting the upward movement of the gear racks 50, 52 relative to floor 32 (FIG. 2). The gear racks 50, 52 are fixed in the instant embodiment and therefore do not move with the slide or other movable structures such as the slides 26. In an alternative embodiment, the pinions 42, 44 may rotate at a fixed location and the rack gears 50, 52 be connected to the food container 24 for movement therewith.

Referring still to FIG. 3, the pinions 42, 44 are connected by an axle 46 which extends therebetween. The axle 46 is rotatably supported by first and second axle mounts 80, 82. The mounts 80, 82 are positioned on the drawer 20 and more specifically, the food container 24. In the depicted embodiments, the axle 46 extends through both of the mounts 80, 82. However, in other embodiments, one axle may be connected to and extend from each mount to allow rotation of associated pinion 42, 44.

As can be seen in the exploded view, the pinions 42, 44 are aligned for engagement with the racks 50, 52. When the drawer 20 is moved relative to the compartment 16, the pinion gears 42, 44 move relative to the racks 50, 52. As one skilled in the art will understand, the gears 42, 44 which are connected by axle 46 move at the same speed relative to the racks 50, 52.

Figure 4:
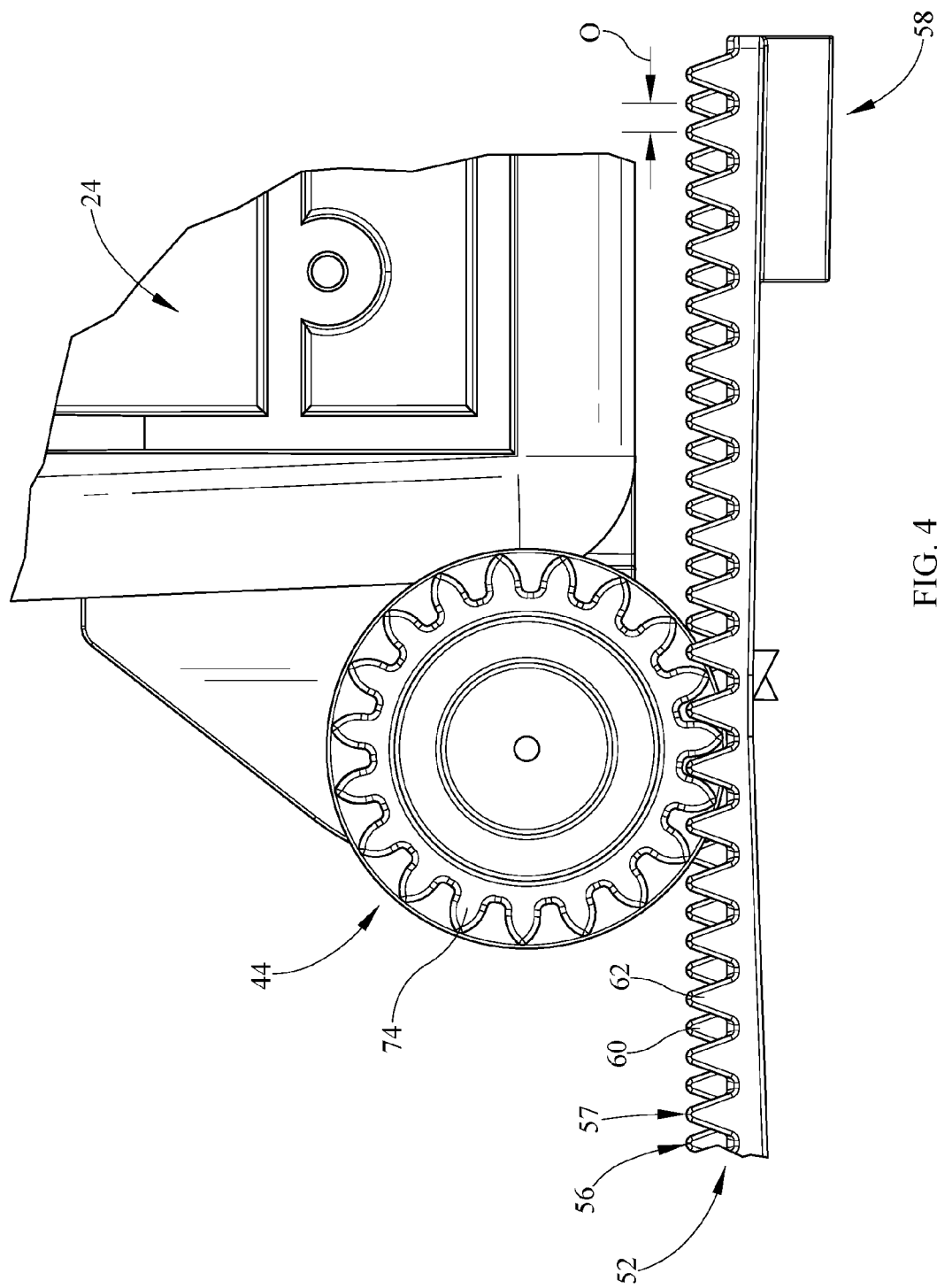
FIG. 4 is a side view of the exemplary gear assembly for an appliance drawer.

Referring now to FIG. 4, a side view of a portion of the geared assembly 40 is depicted. In this view the pinion gear 44 is shown engaging the rack gear 52. The food container 24 is shown connected to mount 82 which also connects to pinion gear 44 by way of the axle 46 (FIG. 3).

With reference now to the pinion gear 44 and rack gear 52 engagement, the rack gear 52 includes two rows of teeth 60, 62. Similarly, the pinion gear 44 includes two rows of teeth which extend circumferentially about the gear 44. In the instant view, only one row 74 of pinion gear teeth is shown. The two rows of rack teeth 60, 62 are offset longitudinally from one another, that is between the first and second ends 54, 55. Thus as shown in the depicted view, each tooth of the row 60 is disposed between two teeth of row 62. The offset "O" as shown may be centered or may not be centered. Further, the teeth 60, 62 defining the rows 56, 57 may be the same size or may differ in size or shape. This provides offset between the two rows 60, 62 of each rack 50, 52. In operation, this reduces the slop between teeth of the pinion gear 42, 44 and rack gear 50, 52, which is created by backlash between the teeth. By reducing this slop or play between pinion gear 40, 42 and the rack gear 50, 52, wobble is reduced between two sides of the drawer 20.

Figure 5:
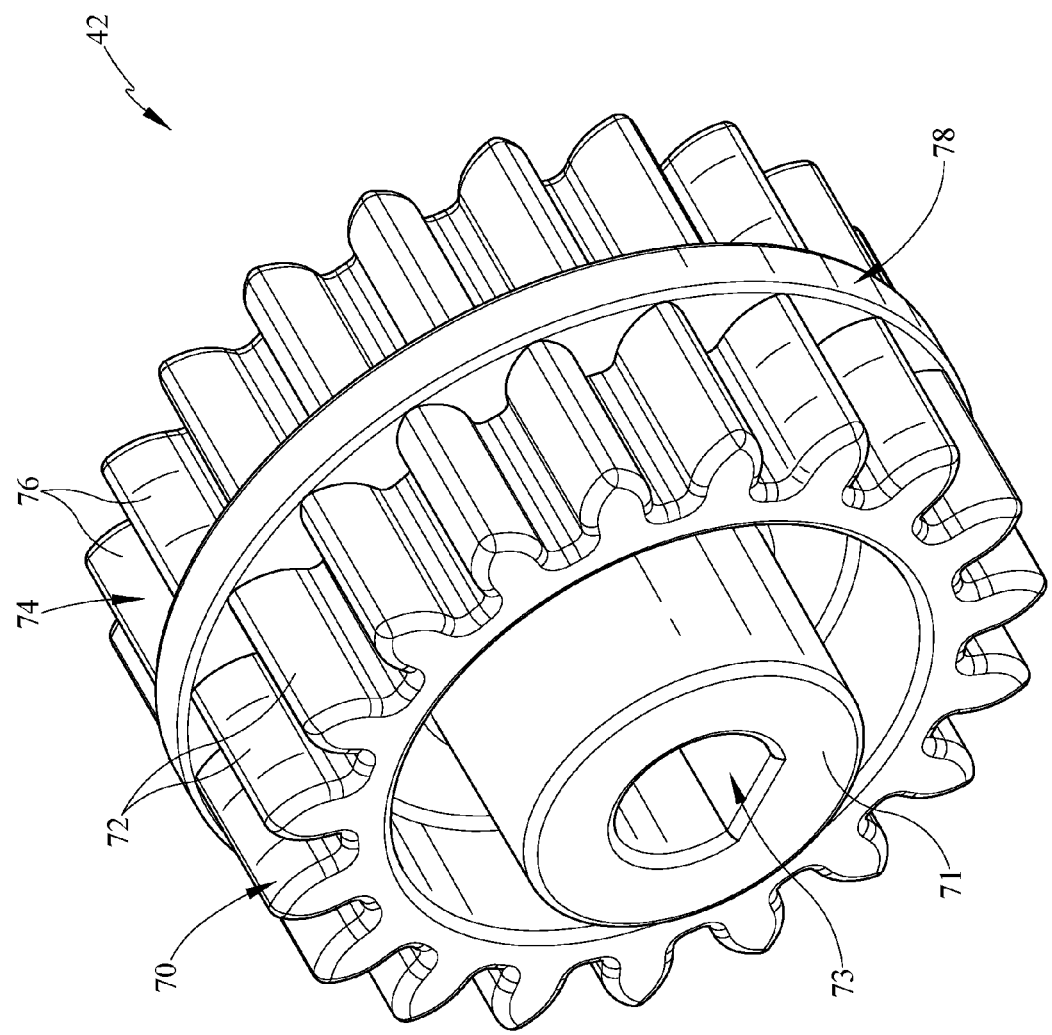
FIG. 5 is a perspective view of an exemplary pinion.

With further reference to FIG. 5, a perspective view of the pinion gear 42 is shown. The pinion gear 42 is identical to the pinion gear 44 and therefore will only be described one time.

The pinion gear 42 includes a first row of gear teeth 70 and a second row of gear teeth 74 both of which extend circumferentially about the pinion gear 42. The first row 70 includes a plurality of gear teeth 72 and the second row 74 includes a plurality of gear teeth 76.

As described with the rack gears 50, 52, the gear teeth of rows 70, 74 are offset from one another circumferentially so that in the axial direction, the teeth of one row are disposed between two teeth of the second row. More specifically, when viewed from above, the tooth 72 of one row 70 is disposed between two teeth 76 of adjacent row 74. This offset may be centered or non-centered. As a result the spacing of the gear teeth 72, 76 is similar to the spacing of the teeth on the rack gears 50, 52. This reduces the play between the pinion gears 42, 44 and the rack gears 50, 52 during operation.

The pinion gear 42 further comprises a central hub 71 with an aperture 73 that receives the axle 46 (FIG. 3). The axle 46 may have some cross-sectional shape that corresponds to the aperture shape 73. According to the instant embodiment, the axle 46 has a flat portion forming a D-shaped cross-section which fits into the central hub 71. However, other shapes may be utilized.

Also extending between the rows 70, 74 of gear teeth 72, 76 is a rib 78. The rib 78 extends radially outward beyond the radial dimension of the teeth 72, 76. The rib 78 is positioned within a depression 90 (FIG. 6) of the rack gear 50, 52. When the rows 70, 74 engage rack rows 56, 57 (FIG. 4), the rib 78 is seated in depression 90. The rib 78 and depression 90 engage one another to maintain longitudinal alignment of the opinion gears 42, 44 during movement of the rack gears 50, 52. In an alternative embodiment, a depression or valley may be located on the pinion gears 42, 44 and a rib 78 may be located on the rack gear 50. The rib 78 may be continuous as shown or may be formed of discontinuous segments extending about the circumference of the pinion gears 42, 44 or along the rack gear.

Figure 6:
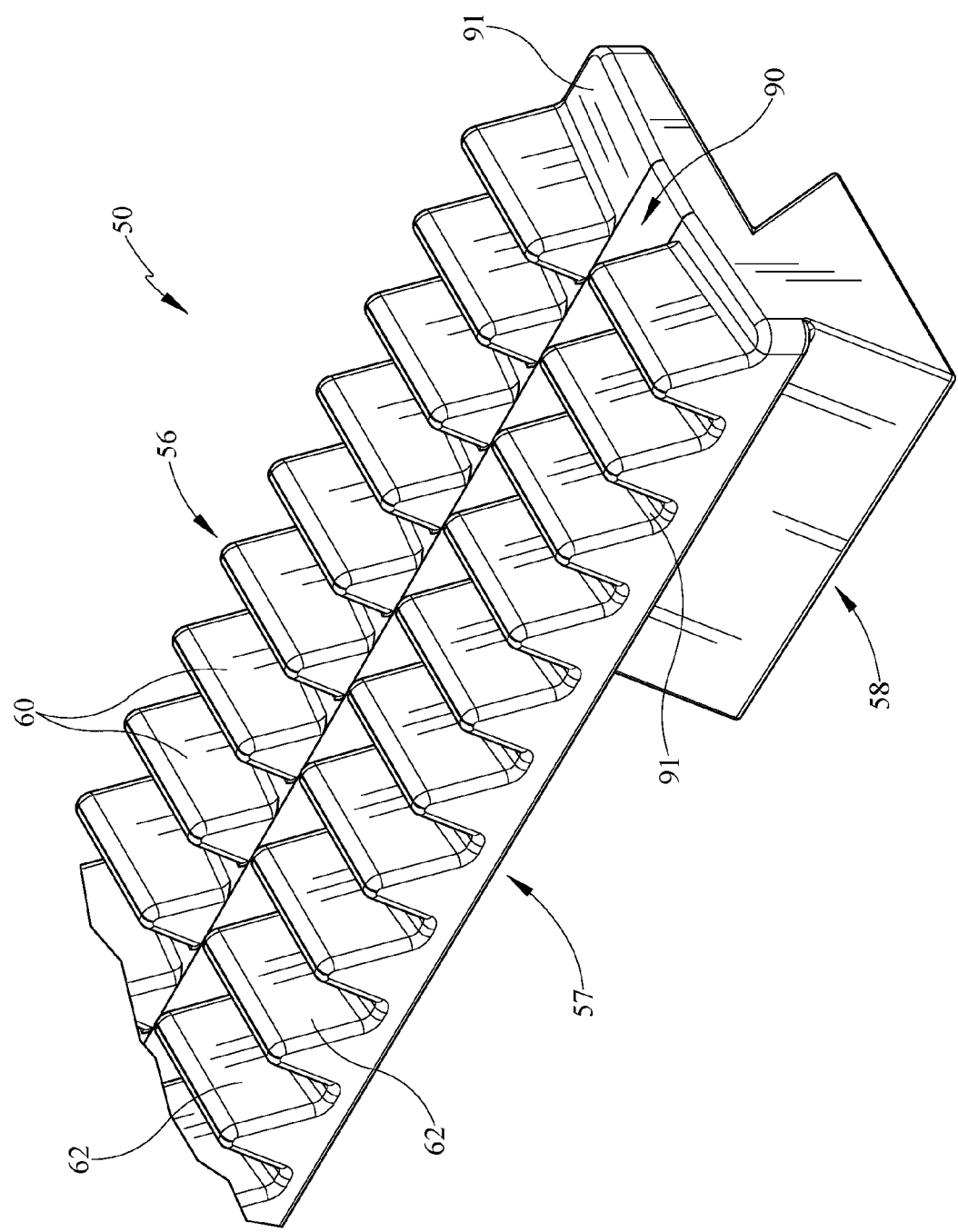
FIG. 6 is a perspective view of a gear rack which is engaged by the pinion.

Referring out to FIG. 6, a perspective view of an exemplary rack gear 50 is depicted. The rack gear 50 is shown cut off at one end. At an opposite end, the rack gear 50 is shown including the retaining structure 58 which according to some embodiments may be generally dovetailed. While a dovetail shape is shown, other shapes may be utilized, for example an upside down T or other retaining shape. The retaining structure 58 connects the rack gear 50 to the floor 32 (FIG. 2).

The rack gear 50 includes a first row 56 and a second row 57 of gear teeth 60, 62, respectively. The depression 90 is located between the first row 56 and the second row 57. The depression 90 extends longitudinally between the first end 54 (FIG. 3) and the second end 55 (FIG. 3) of each rack gear 50, 52. The depression 90 receives the rib 78 of the pinion gears 42, 44. In alternate embodiments, the depression 90 may be a rib extending above gears 60, 62 which is received by a depression in the gear 42.

The surfaces 91, defined by the spaces between teeth 60, 62 may be flat or may be angled toward lateral edges. The angle may allow drainage or fluid condensation on the rack 50.

In this embodiment, the rack gears 50, 52 are stationary while the pinions 42, 44 move with the drawer 20. However, alternate embodiments may be provided wherein the rack gears 50, 52 move with the drawer 20 and a pinion 42, 44 rotates in a stationary position, for example fixed for pivoting movement from the lower compartment housing 30 (FIG. 2).

Figure 7:
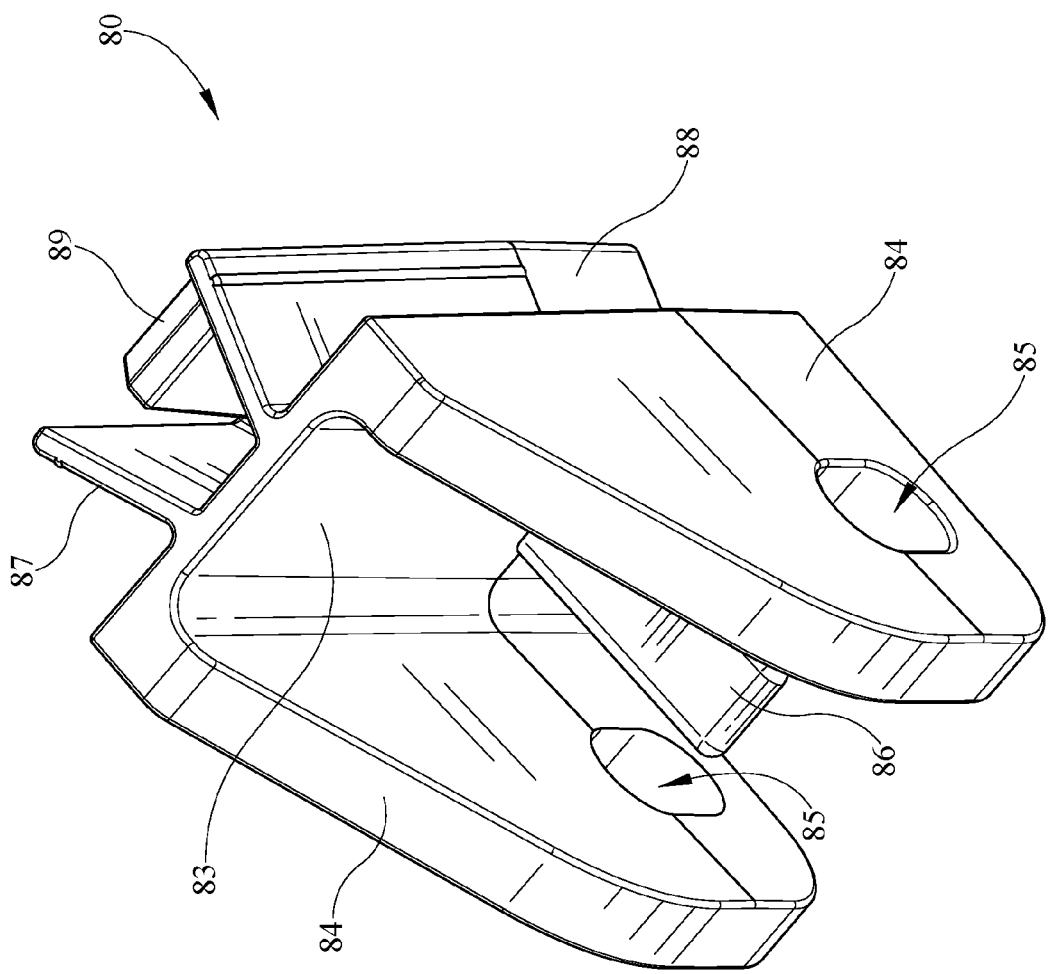
FIG. 7 is a perspective view of an axle mount.

Referring now to FIG. 7, a perspective view of an axle mount 80 is provided. The axle mounts 80, 82 are similar and one mount 80 will be described. The axle mount 80 is positioned on the food container 24 (FIG. 1). More specifically, the mount 80 is disposed on the rear wall 29 (FIG. 2) of the food container 24. However, the mounts 80 may vary in shape so as to mount them at different locations on the food container 24 or drawer 20 (FIG. 1).

The axle mount 80 includes a rear wall 83 and arms 84 extending from the rear wall 83. The arms 84 each comprises a hole 85 through which the axle 46 (FIG. 3) passes. The holes 85 are elongate in shape and sized to allow the axle 46 to rotate. Also, the elongate shape, in the vertical direction, allows for vertical travel of the axle 46 which may occur during movement of the drawer 20. However, the holes 85 are configured to maintain the axle 46 perpendicular to the rack gears 50, 52 (FIG. 3), limiting skewed orientation.

Extending from the rear wall 83 is a force tab 86 which places a downforce on the axle 46 passing through the holes 85. The force tab 86 inhibits the axle 46 from remaining in an upper position of the hole 85 and instead forces the axle 46 downward. Further, the force tab 86 increases engagement between the pinion 42, 44 (FIG. 3) with the rack gears 50, 52.

Extending from an opposite side of the rear wall 83 is a retaining structure, such as a dovetail type structure. According to some embodiments, the retaining structure is formed of a first flange 87 and a second flange 88. The dovetail structure is generally hollow for positioning of a lock tab 89 therein. The locking tab 89 engages with the drawer 20, for example food container 24, to retain the mount 80, 82.

The mounts 80, 82 are slidably positioned on the wall 29 (FIG. 1) of the food container 24 (FIG. 1). As the retaining structure is positioned, the lock tab 89 will engage the wall 29 or ledge of the food container 24 or drawer 20.

Figure 8:
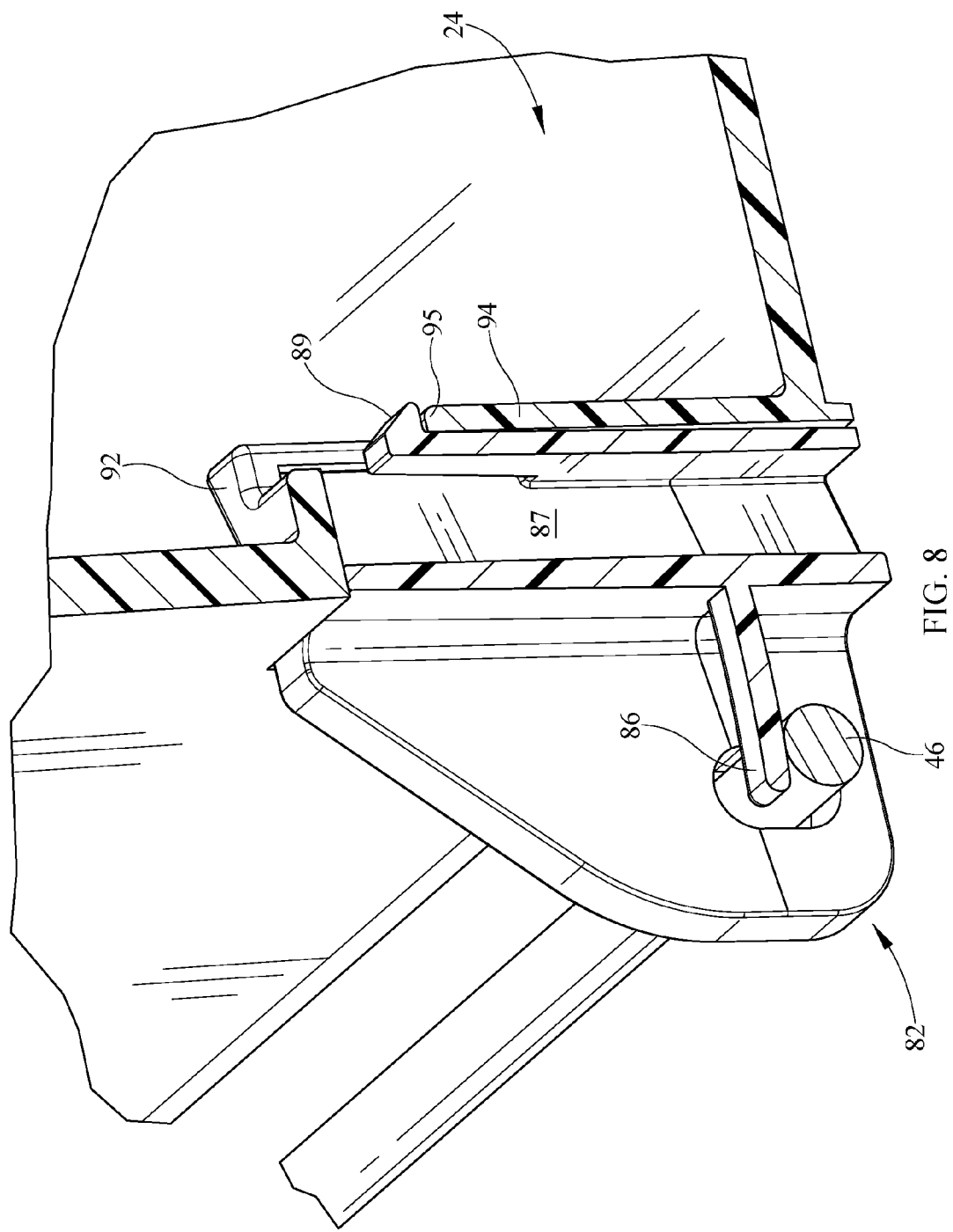
FIG. 8 is a section view of the axle mount positioned on the food container.

Referring now to FIG. 8, a section view of the mount 82 is shown mounted in the food container 24. The food container 24 includes a receiver 92 for each the flanges 87, 88 (FIG. 7). The food container 24 also includes a ledge 94 with an upper edge 95. The lock tab 89 moves upward through the food container 24 until the lock tab 89 passes the upper edge 95. In this position, the mount 82 can receive the axle 46 upon which the pinions 42, 44 are positioned. In some alternatives, the lock tab 89 may alternatively extend from one or both of the flanges 87, 88. In other alternatives, the mounts 80, 82 and container 24 may be slidably engaged by horizontal motion, or in further alternative embodiments, by fastening. Further, if the gear teeth and/or rack teeth become jammed by ice or debris, the mounts 80, 82 may be formed to break away from the drawer 20, or the lock tab 89 may be disengaged so that the mounts 80, 82 and the food container 24 or drawer 20 may be removed.

Figure 9:
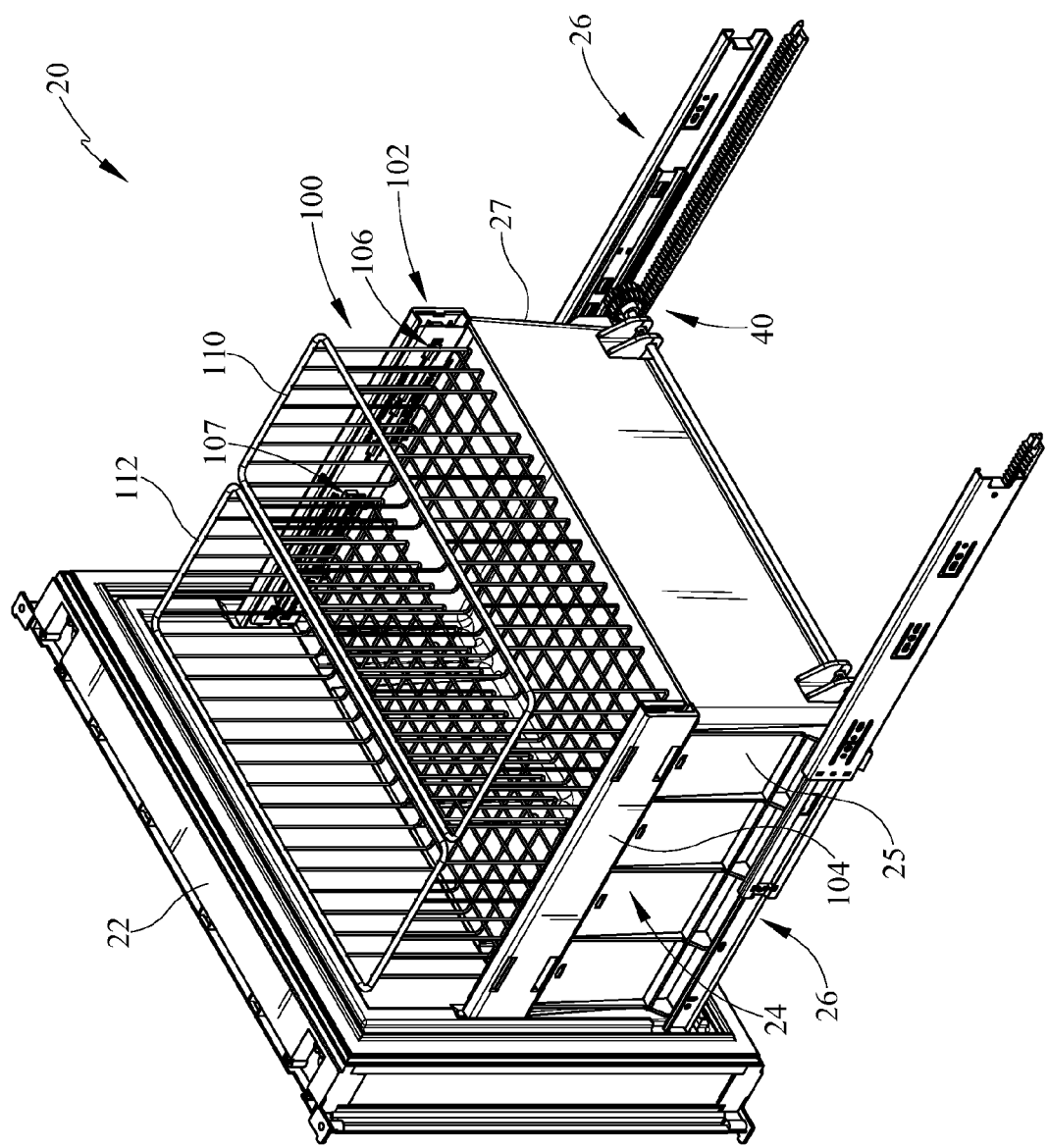
FIG. 9 is a perspective view of the drawer including a secondary food container in a first position relative to the food container.

Referring now to FIG. 9, a perspective view of the drawer 20 is shown removed from the remainder of the appliance 10. The drawer 20 includes the front cover 22 and the food container 24. The container 24 is similar to the previously described structure which includes sidewalls 25, 27. Additionally, the slide assemblies 26 are located along the sidewalls 25, 27 to allow movement of the drawer 20 into and out of an appliance 10. The drawer 20 also includes the geared drawer assembly 40 to synchronize movement of the sidewalls 25, 27 so that the drawer 20 does not become skewed during extension or retraction.

The present embodiment of the drawer 20 further comprises at least one secondary food container 100. The secondary food container 100 may be a single container or may be two or more food containers. In the instant embodiment, two containers 110, 112 are depicted. These may be solid structures or alternatively as shown, may be wire baskets.

The secondary food container 100 allows for movement relative to the food container 24 beneath. Thus, while the cover 22 has a height which is greater than the food container 24, the volume above the top of the food container 24 is not wasted, but instead allows for movement of the containers 110, 112 into and out of the appliance 10.

Along the upper end of the food container 24 are first and second slide assemblies 102, 104. The slide assemblies 102, 104 allow for movement of the at least one secondary food container 100 relative to the food container 24.

With reference to the slide assembly 102, the inside surface of the slide assembly includes a retainer 106. The retainer 106 may comprise one or more clips or other structures to retain the container 110 therein. In the instant embodiment, the slide assembly 102 includes two retainers 106, 107 so as to allow for the connection of two secondary food containers 110, 112, respectively. The opposite slide assembly 104 may also include one or more clips to support the opposite side of the containers 110, 112.

Figure 10:
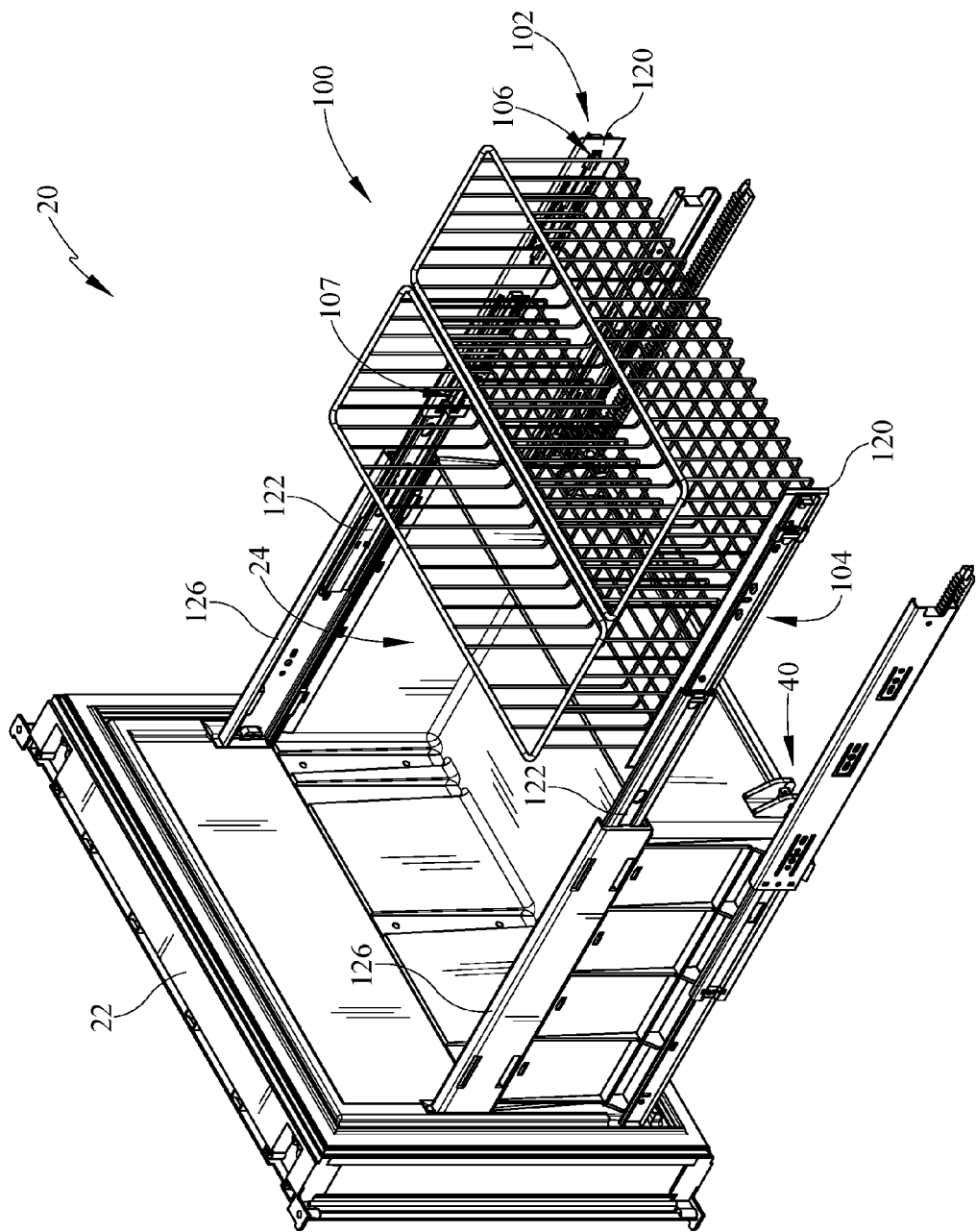
FIG. 10 is a perspective view of the secondary food container in a second position relative to the drawer and food container; and, FIG. 11 is a perspective view of an alternate embodiment of the secondary food container.

Referring now to FIG. 10, a second perspective view of the drawer 20 is depicted with the secondary food container 100 shown in a second position. The slide assemblies 102, 104 are extended which causes movement of the at least one secondary food container 100 to a position such that the food container 24 is exposed for access. In this configuration, a user may open the drawer 20 and push the secondary food container 100 to the rear of the appliance cabinet and access food being stored in the food container 24.

Also as shown in the depicted embodiment, the slide assemblies 102, 104 may be formed of two or more slide rails 120, 122. The present embodiment provides that the slide assemblies 102, 104 further comprise a housing 126 disposed along or near the upper edge of the food container 24. The slide rails 120, 122 may be housed in a nested arrangement within the slide housings 126 and may move by way of ball bearings disposed between the slide housings 126 and the slide rails 120, 122.

Figure 11:
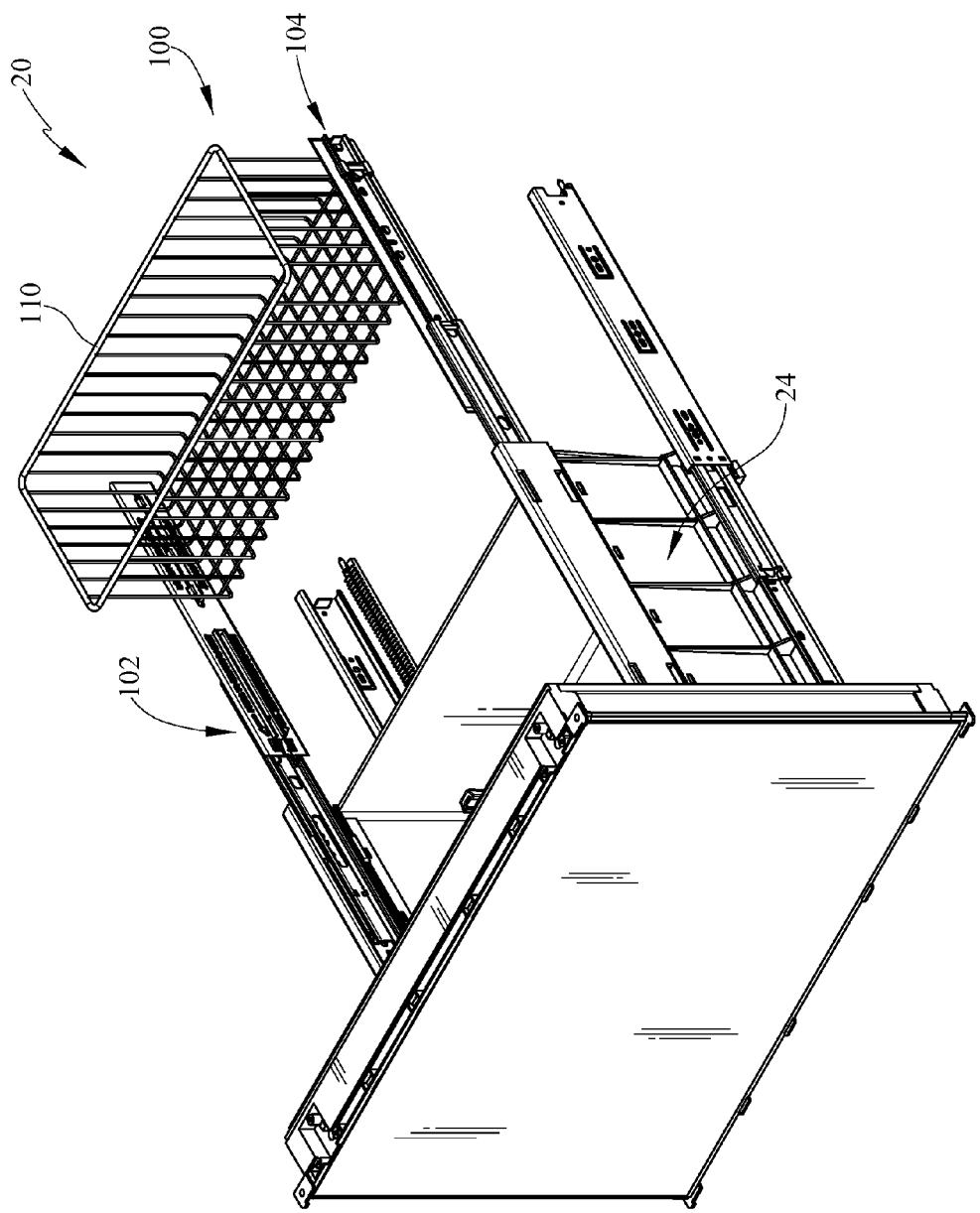

Referring now to FIG. 11, a perspective view of an alternate embodiment of the secondary food container 100 is depicted. In this embodiment, a single secondary food container 110 is depicted. While the food container 110 is shown as the same size as those of FIGS. 9 and 10, in some embodiments the at least one secondary food container 110 may be of a larger size or alternatively, a smaller size than those of the embodiments of FIGS. 9 and 10. Still further, the perspective view also depicts that where two food containers such as the wire baskets 110, 112 are utilized, one or both of the baskets 110, 112 may be removed in order to create space for taller objects which may be stored in the food container 24. Thus, the use of these baskets 110, 112 creates options for removal or use of various sizes depending on the food storage required by the user.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A geared drawer assembly for a cooling appliance, comprising:
   a cabinet having a drawer compartment therein;
   a drawer which is movable into and out of said drawer compartment;
   a first rack gear and a second rack gear disposed within said drawer compartment;
   a first pinion gear and a second pinion gear pivotally mounted to said drawer and engaging said rack gear;
   each of said first and second rack gears having a first row and a second row of gear teeth;
   said first row of gear teeth and said second row of gear teeth being offset in a longitudinal direction;
   a space between the gear teeth on each of said rack gears being angled toward lateral edges to drain fluid from said gear racks.

2. The geared drawer assembly of claim 1, said drawer having one of a basket or a food container.

3. The geared drawer assembly of claim 1 further comprising one of a rib or a depression between said first and second row of gear teeth on said first and second gear racks.

4. The geared drawer assembly of claim 1 wherein a surface between teeth of said gear teeth of said rack gears being one of flat or angled.

5. The geared drawer assembly of claim 1 wherein said pinion gears have a rib which is positioned within a depression between said first and second rows of said gear teeth on said first and second rack gears.

6. The geared drawer assembly of claim 1, said first and second gear pinions each having a first circumferential row and a second circumferential row of gear teeth.

7. The geared drawer assembly of claim 6 wherein said gear teeth of said first circumferential row are offset circumferentially from said gear teeth of said second circumferential row.

8. The geared drawer assembly of claim 6 further comprising an axle extending between said first pinion gear and said second pinion gear.

9. The geared drawer assembly of claim 8 further comprising a first mount and a second mount connected to said drawer.

10. The geared drawer assembly of claim 9 wherein said first mount and said second mount are located on a rear wall of said drawer.

11. The geared drawer assembly of claim 1 wherein a floor of said drawer is elevated from a bottom of said drawer compartment.

12. The geared drawer assembly of claim 1, further comprising a drawer compartment housing.

13. The geared drawer assembly of claim 1, further comprising a food container defining a portion of said drawer.

14. The geared drawer assembly of claim 1 further comprising a secondary food container disposed on an upper edge of said drawer.

15. The geared drawer assembly of claim 14, further comprising slides on said upper end of said drawer.

16. The geared drawer assembly of claim 15, said slides connected to said secondary food container and allowing movement of said secondary food container relative to said drawer.

17. The geared drawer assembly of claim 16, said secondary food container comprising a wire basket.

18. The geared drawer assembly of claim 17, said secondary food container comprising multiple containers.

19. A geared drawer assembly for a cooling appliance, comprising:
   an appliance housing having a drawer compartment therein;
   a food container movable within said drawer compartment;
   a first pinion gear and a second pinion gear rotatably connected to said food container;
   a first rack gear and a second rack gear disposed within said drawer compartment engaging said first pinion gear and second pinion gear, respectively, said first and second rack gears having an upper surface from which rack teeth extend, said upper surface being flat or angled;
   said first and second pinion gears each having a first row and a second row of gear teeth, said gear teeth of said first row and said second row being offset in a circumferential direction of said pinion gears;
   one of a longitudinal rib or a longitudinal depression extending along said rack;
   an axle extending from said first mount to said second mount, said first mount and said second mount each having a force tab which engages said axle and inhibits disengagement of said first and second gear pinions from said first and second gear racks, respectively.

20. The geared drawer assembly of claim 19 further comprising the other of a longitudinal rib or a longitudinal depression extending circumferentially about said first and second gear pinions.

21. The geared drawer assembly of claim 19 further comprising a first mount and a second mount on said food container.

22. A geared drawer assembly, comprising:
an appliance having a compartment and a drawer, said drawer being movable into and out of the compartment;
a first rack gear and a second rack gear fixed within said compartment relative to a floor within said compartment;
a first pinion gear and a second pinion gear, said first pinion gear disposed above said first rack gear and said second rack gear, respectively, and engaging said rack gears;
each of said pinion gears has a first row and a second row of circumferentially arranged gear teeth, said gear teeth of said first row and said gear teeth of said second row being misaligned in an axial direction;
said first rack gear and said second rack gear each having a first row and a second row of gear teeth, said gear teeth of said first row and said gear teeth of said second row being misaligned so that said gear teeth of said pinion gears engage said gear teeth of said rack gears;
a force tab extending from said drawer and applying a force to said first and second pinion gears to maintain engagement with said first and second rack gears.

23. The geared drawer assembly of claim 22, said engagement of said rack gears and said pinion gears reducing wobble of said drawer when said drawer moves relative to said compartment.

24. The geared drawer assembly of claim 22, said gear teeth of pinion gears having a spaced relationship relative to said rack gear teeth, wherein said gear teeth of said rack gears and said pinion gears engage one another.

25. The geared drawer assembly of claim 22 further comprising slides located near an upper end of said drawer.

26. The geared drawer assembly of claim 25 further comprising a secondary food container connected to said slides.

27. The geared drawer assembly of claim 25 said secondary food container capable of movement relative to said drawer.

28. The geared drawer assembly of claim 27 wherein said secondary food container is formed of at least one wire basket.

29. The geared drawer assembly of claim 27, said secondary food container having at least one retaining clip disposed along an inner surface of said slides.

30. A geared drawer assembly, comprising:
a drawer including a cover connected to a food container;
a rack gear positioned on said drawer;
a pinion gear located on a wall of an appliance compartment positioned for engagement of said rack gear;
said pinion gear having first and second rows of gear teeth, said gear teeth of said first row offset in a circumferential direction from said second row of gear teeth;
said rack gear having a first row of rack gear teeth and a second row of rack gear teeth, said first row offset in a longitudinal direction from said second row of rack gear teeth;
wherein said gear teeth on said pinion are a same size and said gear teeth of said rack gear are a same size;
said rack gear including one of a rib and a depression, said pinion gear including the other of said rib and said depression.

31. A geared drawer assembly, comprising:
a drawer having a food container which is slidable relative to a drawer compartment;
a first mount and a second mount removable disposed on said drawer;
an axle disposed through said mounts, said axle having first and second pinion gears disposed near ends thereof, respectively; and,
first and second rack gears disposed in said drawer compartment and being engaged by said first and second pinion gears;
a force tab extending from said first mount and said second mount which inhibits disengagement of said rack gears from said pinion gears.

\* \* \* \* \*